Patented Apr. 3, 1951

2,547,495

UNITED STATES PATENT OFFICE 2,547,495

PRODUCTION OF BIS-PHTHALIMIDO-ESTERS

Stanley P. Rowland, Philadelphia, Pa., assignor to Rohm & Haas Company, Philadelphia, Pa., a corporation of Delaware No Drawing. Application December 28, 1949, Serial No. 135,543

13 Claims. (Cl. 260—326)

This invention relates to new bis-phthalimido-esters and to a process for preparing them. The new compounds have the general formula

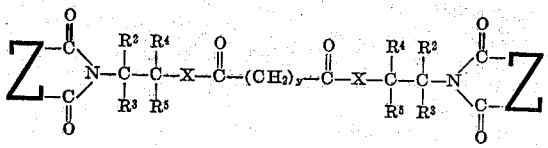

in which X represents an atom of oxygen or sulfur; Z represents a phenylene group, $C_6H_4$, or a naphthylene group, $C_{10}H_6$; the characters $R^2$, $R^3$, $R^4$ and $R^5$ represent hydrogen atoms or monovalent organic radicals which are unreactive with acid anhydrides and, therefore, are free of alcoholic groups and amino-hydrogen atoms and which preferably are hydrocarbon radicals; and $y$ is an integer of value 4 to 8 inclusive.

The process involves a new chemical reaction which comprises chemically combining (a) two molar equivalent weights of phthalic anhydride or a naphthalic anhydride with (b) one molar equivalent weight of a bis-oxazoline or a bis-thiazoline having the formula

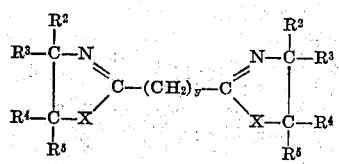

in which the R's and X have the significance described above. This reaction takes place according to the following general equation:

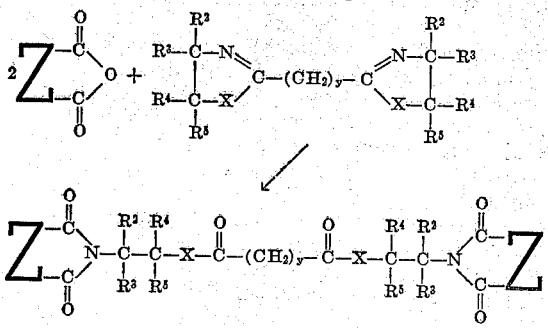

A specific example, in which phthalic anhydride per se and a particular bis-oxazoline, 1,4-tetra-methylene-bis-2-(5-methyloxazoline), are reacted, may make for a clearer understanding, at the outset, of the new reaction of this invention:

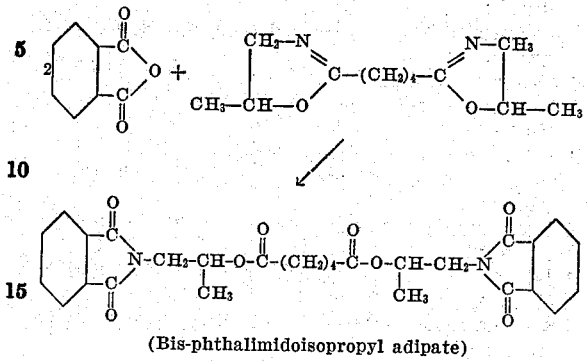

(Bis-phthalimidoisopropyl adipate)

Careful study has shown that naphthalic anhydrides described herein react in the same manner as phthalic anhydride, and that the bis-oxazolines and bis-thiazolines described herein react in the same manner as the bis-oxazoline above. That is, the groups which are represented by the R's, X and Z in the general formula given above remain intact and unchanged during the process, and the reaction does in fact take the course shown above. This process has real advantages over other methods of making imido-esters, such as speed and ease of reaction, quantitativeness or completeness of reaction, and freedom from the formation of by-products.

So that no interfering side-reactions can take place, it is necessary that the organic radicals which are represented by the R's be unreactive with acid anhydrides. Thus, they must be free of such substituents as hydroxyl groups and amino-hydrogen atoms. Whether or not a particular substituent is reactive with acid anhydrides is well within the knowledge of one skilled in chemistry. It is much preferred that the radicals which are represented by the R's be hydrocarbon radicals such as alkyl, aryl, aralkyl, alkaryl, and cycloalkyl. The following list includes examples of such suitable, hydrocarbon radicals: Methyl, ethyl, isopropyl, sec.-butyl, tert.-amyl, 2-ethylhexyl, lauryl, n-tetra-decyl, and octadecyl groups and the isomers of these groups; phenyl, tolyl, benzyl, p-octylphenyl, m-xylyl, 2,4-di-tert.-amylphenyl, cyclohexyl and naphthyl groups.

Although those bis-azolines are preferred in which the substituents represented by the R's are hydrocarbon radicals, it is a fact that bis-phthalimido esters are readily prepared from phthalic and naphthalic anhydrides and bis-azolines in which the substituents, R's $^{2\text{ to }5}$, also contain other elements in addition to carbon and hydrogen. Thus, halogen groups may be present as well as nitro, ether, keto, aldehydo, sulfonic, and tertiary amine groups. None of these groups reacts with acid anhydrides and none interferes with the reaction of the phthalic and naphthalic anhydrides with the bis-oxazolines or bis-thiazolines.

Suitable and operable bis-azolines; that is, both bis-oxazolines and bis-thiazolines, include the following by way of example:

1,4-tetramethylene bis-azolines;
1,4-tetramethylene-bis-2-(5-methylazolines);
1,8-octamethylene bis-azolines;
1,5-pentamethylene-bis-2-(5-ethylazolines);
1,6-hexamethylene-bis-2-(5-phenylazolines);
1,7-heptamethylene-bis-2-(5-p-chlorophenylazolines);
1,8-octamethylene-bis-2-(4,5-dimethylazolines);
1,8-octamethylene-bis-2(5,5-dimethylazolines;
1,7-heptamethylene-bis-2-(4,4,5-triethylazolines);
1,5-pentamethylene-bis-2-(4,4,5,5-tetramethylazolines);
1,4-tetramethylene-bis-2-(5-naphthylazolines);
1,4-tetramethylene-bis-2-(5-chloromethylazolines);
1,5-pentamethylene-bis-2-(5-benzylazolines);
1,6-hexamethylene-bis-2-(5-p-nitrophenylazolines);
1,4-tetramethylene-bis-2-(5-diethylaminoazolines);
1,4-tetramethylene-bis-2-(5-diisobutylaminoazolines);
1,6-hexamethylene-bis-2-(5-phenyl-5-methylazolines);
1,4-tetramethylene-bis-2-(4-methyl-4-ethylazolines);
1,4-tetramethylene-bis-2-(4-methyl-5-phenylazolines);
1,4-tetramethylene-bis-2-(4,4-dibenzylazolines);
1,6-hexamethylene-bis-2-(4,5-dipropylazolines);
1,6-hexamethylene-bis-2-(4,4-dibutyl-5-isopropylazolines);
1,7-heptamethylene-bis-2-(4-naphthylazolines);
1,8-octamethylene-bis-2-(5-tolylazolines)

and the like.

The naphthalic anhydrides which are known to react according to the process of this invention include 1,8-naphthalic, 1,2-naphthalic, and 2,3-naphthalic anhydrides. Preference is given to the 1,8-naphthalic anhydride due to its availability. Furthermore, the anhydrides can be substituted by halogen or nitro groups without losing their reactivity with the bis-azolines.

The reactions between the phthalic and naphthalic anhydrides and the bis-azolines take place fairly readily and often exothermically. Reaction occurs even at room temperature (20° C.) but the rate of reaction is unnnecessarily slow. Heating of the reactants accelerates the rate of reaction and for this reason a minimum temperature of 50° C. is recommended. Temperatures up to 300° C. are operable but at the higher temperatures by-products are formed. Accordingly, an upper temperature of 250° C. is much preferred. It has also been found that in general it is advantageous to maintain as low a temperature of reaction as is feasible when the bis-azoline carries two substituents, such as alkyl groups, in the positions occupied by $R^4$ and $R^5$ in the general formula above. In such cases a maximum temperature of about 150° C. is suggested For convenience, inert solvents can be employed. Likewise, catalysts, such as alcoholates, zinc chloride, and the like, can be used although ordinarily the reaction takes place rapidly enough in the absence of catalysts. Other expedients well known to those skilled in the art, such as variations in pressure, solvent-extraction of the product, excess of one reactant, and the like, can be used without departing from the spirit of this invention which is to prepare bis-phthalimido- and bis-naphthalimido-esters by reacting, preferably under the influence of heat, two molar equivalent weights of a phthalic or a naphthalic anhydride and one molar equivalent weight of a bis-oxazoline or of a bis-thiazoline.

The following examples serve to illustrate the process of this invention.

Example 1

Phthalic anhydride and 1,8-octamethylene-bis-2-(5-methyloxazoline) in the ratio of two molar equivalent amounts of the former to one of the latter were thoroughly mixed and sealed in a glass tube. The tube was then heated to 190° C. and held at that temperature for three hours. The product when cooled to room temperature was a solid which was soluble in dioxane, acetone, ethanol, and xylene. It had an acid number of 19.5 which showed that 95% of the phthalic anhydride and bis-azoline had reacted. The product was dissolved in xylene and the resultant solution was washed thoroughly first with a 5% sodium hydroxide solution, then with a dilute solution of hydrochloric acid and finally with water. The washed solution was evaporated to dryness. The analysis of the product corresponded to the calculated values for bis-phthalimidoisopropyl sebacate.

Example 2

By the same procedure as was described in Example 1, one molar equivalent amount of 1,7-heptamethylene-bis-2-(5-methyloxazoline) was reacted with two molar equivalent amounts of 1,8-naphthalic anhydride. The product had an acid number of 9.7 which showed that the reaction was 96% complete. The analysis of the product, after the latter was purified by the method of Example 1, corresponded to that calculated for bis-naphthalimidoisopropyl azelate.

Example 3

Into a three-necked flask, equipped with thermometer, agitator, and reflux condenser, was placed a mixture of two moles of 1,7-heptamethylene-bis-2-(5-methyloxazoline) and one mole of tetrachlorophthalic anhydride and sufficient dioxane to form a homogeneous solution. The mixture was stirred at room temperature and after 70 hours the reaction was 52% complete, as measured by titration of the unreacted phthalic anhydride with a standardized solution of potassium hydroxide. The mixture was then heated with distillation of the dioxane to 180° C. After three hours the reaction was 75% complete. The product was a hard solid which was soluble in dioxane and acetone. Upon purification by the process described in Example 1, the analysis of the product corresponded to that calculated for bis-tetrachloro-phthalimidoisopropyl azelate.

Example 4

By the procedure described in Example 3, two molar equivalent weights of nitrophthalic anhydride and one molar equivalent weight of 1,4 - tetramethylene - bis-2-(5-methyloxazoline) were mixed and reacted first for 60 hours at room temperature and then for 90 minutes at 185° C. As determined by titration of the unreacted phthalic anhydride, the reaction was 27% complete after 60 hours at room temperature and 77% complete after the heating period. Here, again, the product was a solid which was soluble in acetone and dioxane and which, when purified, had an analysis corresponding to that of nitrophthalimidoisopropyl adipate.

Example 5

Further demonstration of the general applicability of the process of this invention was made by reacting two molar equivalent amounts of phthalic and naphthalic anhydrides with one molar equivalent amount of various bis-oxazolines and bis-thiazolines at 180° C. for three hours. After the period of reaction, the extent of the reaction was determined by titration of the unreacted anhydride with a standardized solution of potassium hydroxide. Following is a tabulation of the reactants and the extent to which they reacted with the formation of the corresponding bis-phthalimido-esters or thioesters according to the general equation above. In all cases, the results of analysis confirm the structure of the imido-ester.

| Anhydride | Bix-Azoline | Extent of Reaction |
|---|---|---|
| Hexahydrophthalic | 1,7-Heptamethylene-bis-2-(5-methyloxazoline). | 94 |
| Phthalic | 1,5-Pentamethylene-bis-2-(4,4-dimethyloxazoline). | 92 |
| 1,8-Naphthalic | 1,5-Pentamethylene-bis-2-(4,4-dimethyloxazoline). | 88 |
| Phthalic | 1,8-Octamethylene-bis-2-(4,5-diethyloxazoline). | 93 |
| 1,3-Naphthalic | 1,4-Tetramethylene-bis-2-(4,4,5-trimethyloxazoline). | 78 |
| Phthalic | 1,6-Hexamethylene-bis-2-(5-hexyloxazoline). | 91 |
| Do | 1,4-Tetramethylene-bis-2-(5-methylthiazoline). | 84 |
| 1,8-Naphthalic | 1,4-Tetramethylene-bis-2-(5-methylthiazoline). | 82 |
| Do | 1,6-Hexamethylene-bis-2-(5-phenyloxazoline). | 89 |
| Phthalic | 1,8-Octamethylene-bis-2-(4,4-dimethylthiazoline). | 81 |
| Do | 1,6-Hexamethylene-bis-2-(5-p-chlorophenyloxazoline). | 88 |

It will be noted from the above examples that phthalic and napthalic anhydrides react alike, as well as substituted anhydrides; and that bis-oxazolines and bis-thiazolines react alike. It is true that the substituents on the bis-azolines, which are represented by the R's in the general formulas above, as well as the methylene groups between the heterocyclic rings of the bis-azolines do not take part in the reaction and do not interfere with the reaction between the anhydrides and the bis-azolines. Extensive study of the general process has shown that it is advantageous to employ lower temperatures (below about 150° C.) when the two $R^4$'s and the two $R^5$'s are hydrocarbon substituents.

The products of this invention have a wide variety of uses. Many of them have marked properties as regulants for plant growth. Others are effective as additives for lubricating oils. Still others are compatible with synthetic plastics and serve as modifiers therefor.

I claim:

1. A process for the preparation of bis-phthalimido-esters of the general formula

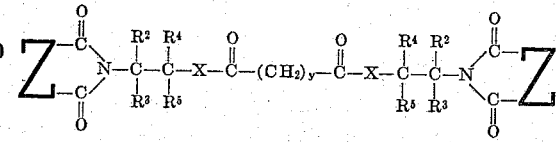

which comprises chemically reacting at a temperature from 20° C. to 300° C. two molar equivalent weights of an anhydride of the formula

and one molar equivalent weight of a bis-azoline of the general formula

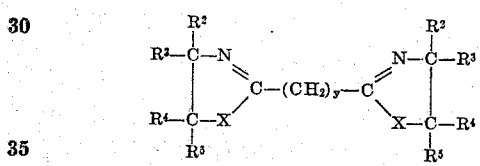

in which formulas $y$ is an integer of value 4 to 8 inclusive; X represents an atom of an element from the class consisting of oxygen and sulfur; Z represents a divalent radical from the class consisting of phenylene and naphthylene radicals; and $R^2$, $R^3$, $R^4$, and $R^5$ represent members of the class consisting of hydrogen atoms and alkyl aryl, aralkyl, alkaryl, and cycloalkyl groups.

2. A process for the preparation of bis-phthalimido-esters of the general formula

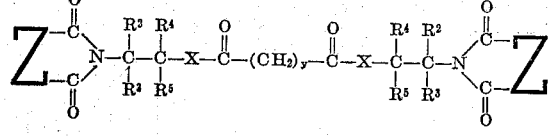

which comprises chemically reacting at a temperature from 50° C. to 250° C. two molar equivalent weights of an anhydride of the formula

and one molar equivalent weight of a bis-azoline of the general formula

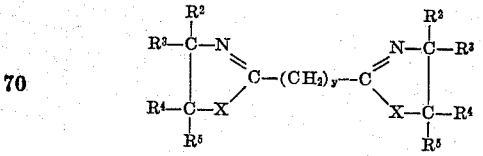

in which formulas $y$ is an integer of value 4 to 8 inclusive; X represents an atom of an element from the class consisting of oxygen and sulfur; Z represents a divalent radical from the class consisting of phenylene and naphthylene radicals; and $R^2$, $R^3$ $R^4$, and $R^5$ represent members of the class consisting of hydrogen atoms and akyl, aryl, aralkyl, alkaryl, and cycloalkyl groups.

3. A process for the preparation of bis-phthalimidoiso-propyl adipate which comprises chemically reacting at a temperature of 50° C. to 250° C. two molar equivalent weights of phthalic anhydride and one molar equivalent weight of 1,4-tetramethylene-bis-2-(5-methyloxazoline).

4. A process for the preparation of bis-phthalimidoiso-propyl sebacate which comprises chemically reacting at a temperature of 50° C. to 250° C. two molar equivalent weights of phthalic anhydride and one molar equivalent weight of 1,8-octamethylene-bis-2-(5-methyloxazoline).

5. A process for the preparation of bis-naphthalimido-isopropyl adipate which comprises chemically reacting at a temperature of 50° C. to 250° C. two molar equivalent weights of naphthalic anhydride and one molar equivalent weight of 1,4-tetramethylene-bis - 2 - (5 - methyloxazoline).

6. As new chemical compounds, bis-phthalimido-esters of the general formula

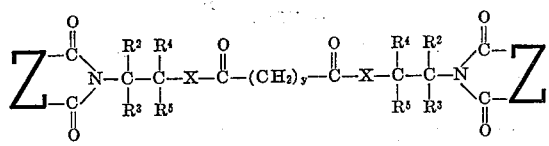

in which $y$ is an integer of value 4 to 8 inclusive; X represents an atom of an element from the class consisting of oxygen and sulfur; Z represents a divalent radical from the class consisting of phenylene and naphthylene radicals; and $R^2$, $R^3$, $R^4$, and $R^5$ represent members of the class consisting of hydrogen atoms and alkyl, aryl, aralkyl, alkaryl, and cycloalkyl groups.

7. As a new chemical compound, bis-phthalimidoiso-propyl adipate having the formula

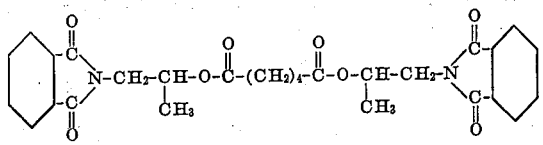

8. As a new chemical compound, bis-phthalimidoiso-propyl sebacate having the formula

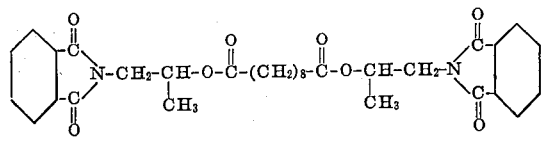

9. As a new chemical compound, bis-beta-phthalimido-alpha-phenyl-ethyl sebacate having the formula

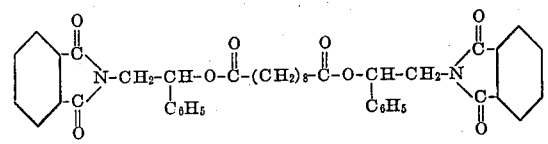

10. A process for the preparation of bis-phthalimido-isopropyl pimelate which comprises chemically reacting at a temperature of 50° C. to 250° C. two molar equivalent weights of phthalic anhydride and one molar equivalent weight of 1,5-penta-methylene-bis-2-(5-methyloxazoline).

11. A process for the preparation of bis-naphthalimido-isopropyl adipate which comprises chemically reacting at a temperature of 50° C. to 250° C. two molar equivalent weights of naphthalic anhydride and one molar equivalent weight of 1,4-tetramethylene-bis - 2 - (5 - methyloxazoline).

12. As a new chemical compound, bis-phthalimido-isopropyl pimelate having the formula

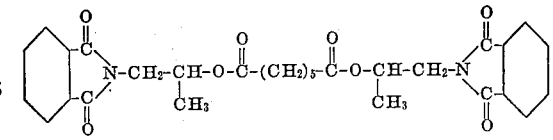

13. As a new chemical compound, bis-naphthalimido-isopropyl adipate having the formula

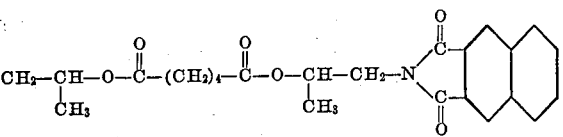

STANLEY P. ROWLAND.

No references cited.